(12) United States Patent
Xing et al.

(10) Patent No.: US 10,383,047 B2
(45) Date of Patent: Aug. 13, 2019

(54) METHOD AND APPARATUS FOR ESTABLISHING A SERVICE IN A FIRST FREQUENCY

(75) Inventors: Pingping Xing, Shanghai (CN); Zhongji Hu, Shanghai (CN); Yu Chen, Shanghai (CN); Hua Chao, Shanghai (CN)

(73) Assignee: ALCATEL LUCENT, Nozay (FR)

(*) Notice: Subject to any disclaimer, the term of this patent is extended or adjusted under 35 U.S.C. 154(b) by 878 days.

(21) Appl. No.: 12/298,184

(22) PCT Filed: Apr. 17, 2007

(86) PCT No.: PCT/CN2007/001251
§ 371 (c)(1),
(2), (4) Date: May 26, 2009

(87) PCT Pub. No.: WO2007/128205
PCT Pub. Date: Nov. 15, 2007

(65) Prior Publication Data
US 2009/0318149 A1    Dec. 24, 2009

(30) Foreign Application Priority Data
Apr. 26, 2006 (CN) .......................... 2006 1 0026083

(51) Int. Cl.
*H04W 48/20* (2009.01)
*H04W 4/06* (2009.01)
(Continued)

(52) U.S. Cl.
CPC .............. *H04W 48/20* (2013.01); *H04W 4/06* (2013.01); *H04W 36/0007* (2018.08); *H04W 36/38* (2013.01); *H04W 72/005* (2013.01)

(58) Field of Classification Search
CPC ..... H04W 36/38; H04W 72/005; H04W 4/06; H04W 48/20; H04W 36/0007
(Continued)

(56) References Cited

U.S. PATENT DOCUMENTS 6,347,091 B1 * 2/2002 Wallentin .............. H04W 28/18
370/235
7,948,940 B2    5/2011 Jeong et al.
(Continued)

FOREIGN PATENT DOCUMENTS

CN    1738486 A    2/2006
CN    1753559 A    3/2006
(Continued)

OTHER PUBLICATIONS

International Search Report for Application No. PCT/CN2007/001251.
(Continued)

*Primary Examiner* — Dinh Nguyen
(74) *Attorney, Agent, or Firm* — Fay Sharpe LLP

(57) ABSTRACT

The present invention relates to a method for establishing a service in a first frequency in a communication network, wherein the first frequency does not support the service or supports it in a limited way, the method comprises the following steps: determining the service to be established, re-selecting or redirecting to a second frequency that is suitable for the service, so as to carry out the service in the second frequency. The present invention also relates to user equipment and a network apparatus for establishing a service in a first frequency in a communication network, wherein the first frequency does not support the service or supports it in a limited way. According to the present invention, a non-MBMS service may be established in the
(Continued)

MBMS dedicated frequency, so as to carry out the non-MBMS service in the normal frequency.

12 Claims, 6 Drawing Sheets

(51) Int. Cl.
 *H04W 36/38* (2009.01)
 *H04W 72/00* (2009.01)
 *H04W 36/00* (2009.01)

(58) Field of Classification Search
 USPC ............. 455/432.1, 434, 436, 437, 447
 See application file for complete search history.

(56) References Cited

U.S. PATENT DOCUMENTS

| | | |
|---|---|---|
| 2003/0088695 A1 | 5/2003 | Kwak et al. |
| 2004/0202140 A1* | 10/2004 | Kim et al. ............... 370/335 |
| 2005/0090278 A1 | 4/2005 | Jeong et al. |
| 2005/0147127 A1 | 7/2005 | Putcha et al. |
| 2005/0153715 A1* | 7/2005 | Hwang ............... H04W 68/025 455/458 |
| 2006/0058047 A1* | 3/2006 | Jeong et al. ............... 455/464 |
| 2006/0126590 A1* | 6/2006 | Putcha et al. ............... 370/343 |
| 2006/0140159 A1* | 6/2006 | Choi ............... H04W 92/14 370/336 |

FOREIGN PATENT DOCUMENTS

| | | |
|---|---|---|
| EP | 1 349 409 A1 | 10/2003 |
| EP | 1 626 534 A1 | 2/2006 |
| WO | 01/26409 | 4/2001 |
| WO | WO 2005/067493 A2 | 7/2005 |

OTHER PUBLICATIONS

Supplemental European Search Report for corresponding European Application No. 07720824.7, dated Jun. 12, 2014, 6 pages.

* cited by examiner

METHOD AND APPARATUS FOR ESTABLISHING A SERVICE IN A FIRST FREQUENCY

FIELD OF THE INVENTION

The present invention relates to the field of communication, and more particularly to a method and apparatus for establishing a service in a first frequency, wherein the first frequency does not support the service or supports it in a limited way.

BACKGROUND OF THE INVENTION

In a radio communication system which supports services like multimedia broadcast multicast service (MBMS) which occupies many radio resources, a typical solution to save radio resources is to assign a dedicated frequency to the MBMS service.

MBMS service is of the broadcast nature, which may support far more users in a frequency than other services, for example an interactive service. But to services of other types, the capacity for the dedicated frequency is quite limited. So if user equipment in the dedicated frequency initiates a service of other type, the system will be unable to support and congestion will be caused. Thus, typically, the MSMS dedicated frequency only supports MBMS service, but does not support any non-MBMS services or supports non-MBMS services (for example data service) in a limited way.

According to associated 3GPP standards, before a MBMS service is initiated, the Universal Mobile Telecommunications System Terrestrial Radio Access Network (UTRAN) uses a Frequency Layer Convergence (FLC) technique to re-select user equipment (UE) interested in the MBMS service to the MBMS dedicated frequency.

Upon completion of the MBMS service, the UTRAN uses a Frequency Layer Dispersion (FLD) technique to disperse UE to another frequency (i.e. a normal frequency supporting any non-MBMS services) by sending a message indicating the frequency layer dispersion.

When a MBMS service is ongoing, since the MBMS dedicated frequency does not support any non-MBMS services (for example a voice call), UE can not perform a calling or called non-MBMS service in the MBMS dedicated frequency, wherein a calling service indicates that the non-MBMS service originates from the UE, while a called service indicates that the non-MBMS service terminates at the UE.

SUMMARY OF THE INVENTION

An object of the present invention is to provide a solution which is capable of overcoming the aforementioned technical problems in the prior art, thereby capable of establishing a service in a first frequency, wherein the first frequency does not support the service or supports it in a limited way, so as to carry out the service in a frequency supporting the service.

Another object of the present invention is to enable a non-MBMS service to be established in a MBMS dedicated frequency so as to carry out the non-MBMS service in the normal frequency.

According to an aspect of the present invention, there is provided a method for establishing a service in a first frequency in a communication network, wherein the first frequency does not support the service or supports it in a limited way, the method comprises the following steps: determining the service to be established, re-selecting or redirecting to a second frequency that is suitable for the service, so as to carry out the service in the second frequency.

According to another aspect of the present invention, there is provided user equipment for establishing a service in a first frequency in a communication network, wherein the first frequency does not support the service or supports it in a limited way, the user equipment comprises means for determining the service to be established and means for re-selecting to a second frequency that is suitable for the service, so as to carry out the service in the second frequency.

According to a further aspect of the present invention, there is provided a network apparatus for establishing a service in a first frequency in a communication network, wherein the first frequency does not support the service or supports it in a limited way, the network apparatus comprises means for determining the service to be established by user equipment and means for re-directing the user equipment from the first frequency to a second frequency that is suitable for the service, so as to carry out the service in the second frequency.

According to the present invention, a service can be established in a first frequency, wherein the first frequency does not support the service or supports it in a limited way, so as to carry out the service in a frequency supporting the service.

Further, according to the present invention, a non-MBMS service can be established in a MBMS dedicated frequency, so at to carry out the non-MBMS service in a normal frequency.

In this way, users may have more choices, for example, if a non-MBMS service is more important than a MBMS service, he/she may hand over from the MBMS service to the non-MBMS service.

BRIEF DESCRIPTION ON THE DRAWINGS

Other objects and effects of the present invention will become more apparent and easy to understand from the following description, taken in conjunction with the accompanying drawings, wherein.

In all the above figures, like reference numerals designate the same, similar, or corresponding features or functions throughout the drawings.

DESCRIPTION OF THE PREFERRED EMBODIMENTS

The present invention provides a solution for establishing a service (a non-MBMS service) in a first frequency (a MBMS dedicated frequency) in a communication network, wherein the first frequency does not support the service or supports it in a limited way. A fundamental thought of the present invention is to determine a service to be established and to re-select or redirect to a second frequency (a normal frequency) that is suitable for the service, so as to carry out the service in the second frequency.

Hereinafter, the preferred embodiments of the present invention will be described in detail with the MBMS service as an example.

Figure 1:
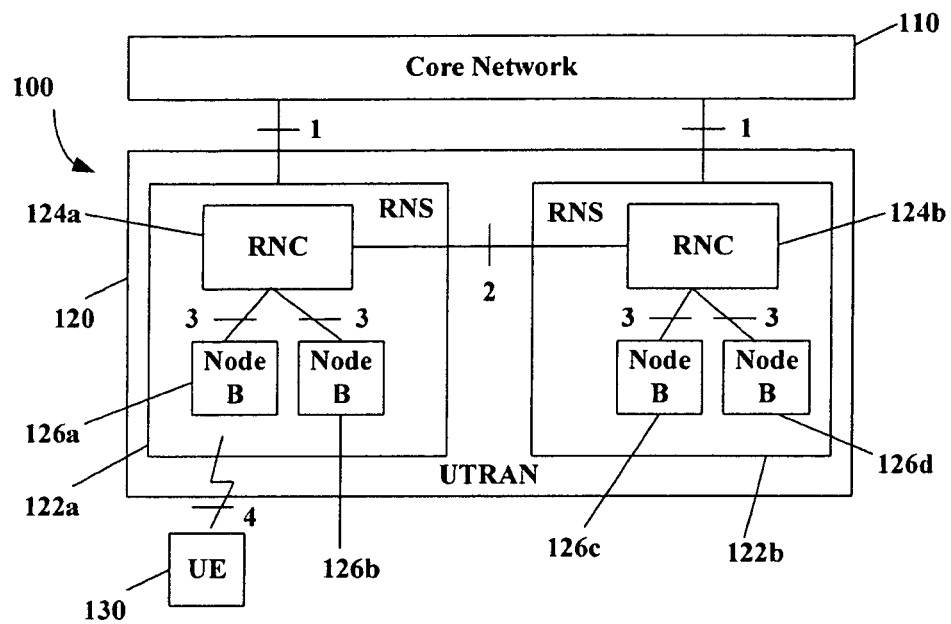
FIG. 1 shows a diagram of a communication network in which the present invention can be implemented.

FIG. 1 shows a diagram of a communication network in which the present invention can be implemented. As shown in FIG. 1, communication network 100 comprises three parts, i.e. a core network 110, a UTRAN 120 and UE 130. The UTRAN 120 comprises one or more radio network subsystem (RNS) 122a, 122b, each of which further comprises radio network controller (RNC) 124a, 124b and node Bs (or base stations) 126a, 126b, 126c, 126d.

The core network 110 handles exchanging and routing, with an external network, of voice call or data connection inside the communication network 100, while the radio network subsystem 122a, 122b handles all functions associated with radio.

RNC 124a, 124b are connected to the core network 110 via interface 1 (for example the Iu interface). Node B is connected to RNC via interface 3 (for example the Iub interface). RNCs are connected to each other via interface 2 (for example the Iur interface). UE 130 interacts with a network apparatus (for example node B 126a) via radio interface 4 (for example, the Uu interface).

According to associated 3GPP standards, UE has different radio resources control (RRC) modes and states. Specifically, UE has two modes: idle mode and UTRAN connection mode. The connection mode is further divided into four states: URA-PCH, CELL-PCH, CELL-FACH and CELL-DCH. Since the above modes and states are known to the skilled in the art, further description thereof is omitted here for purpose of concision.

According to the embodiments of the present invention, different solutions are provided with respect to different scenarios, for example, whether a non-MBMS service originates from UE or terminates at UE, as well as RRC modes and states of UE.

Hereinafter, different scenarios and their solutions will be described one by one, where given that two kinds of frequencies are used in the following embodiments, one frequency (first frequency) being dedicated to a MBMS service, which only supports a MBMS service or supports a non-MBMS service in a limited way (for example, only supporting data service or occupation of network resources being under a certain threshold), and the other frequency (second frequency) being a normal frequency, which supports any non-MBMS services.

Scenario 1:

UE calls a non-MBMS service, for example, a voice call, in a MBMS dedicated frequency. In other words, the non-MBMS service originates from the UE. Upon the UE receives a corresponding command input by the user thereof (for example, the user inputs a telephone number by pressing number buttons and presses a call key), the UE is capable of determining a non-MBMS service originating therefrom to be carried out.

For this scenario, there may be two solutions for establishing the non-MBMS service in the MBMS dedicated frequency.

Figure 2:
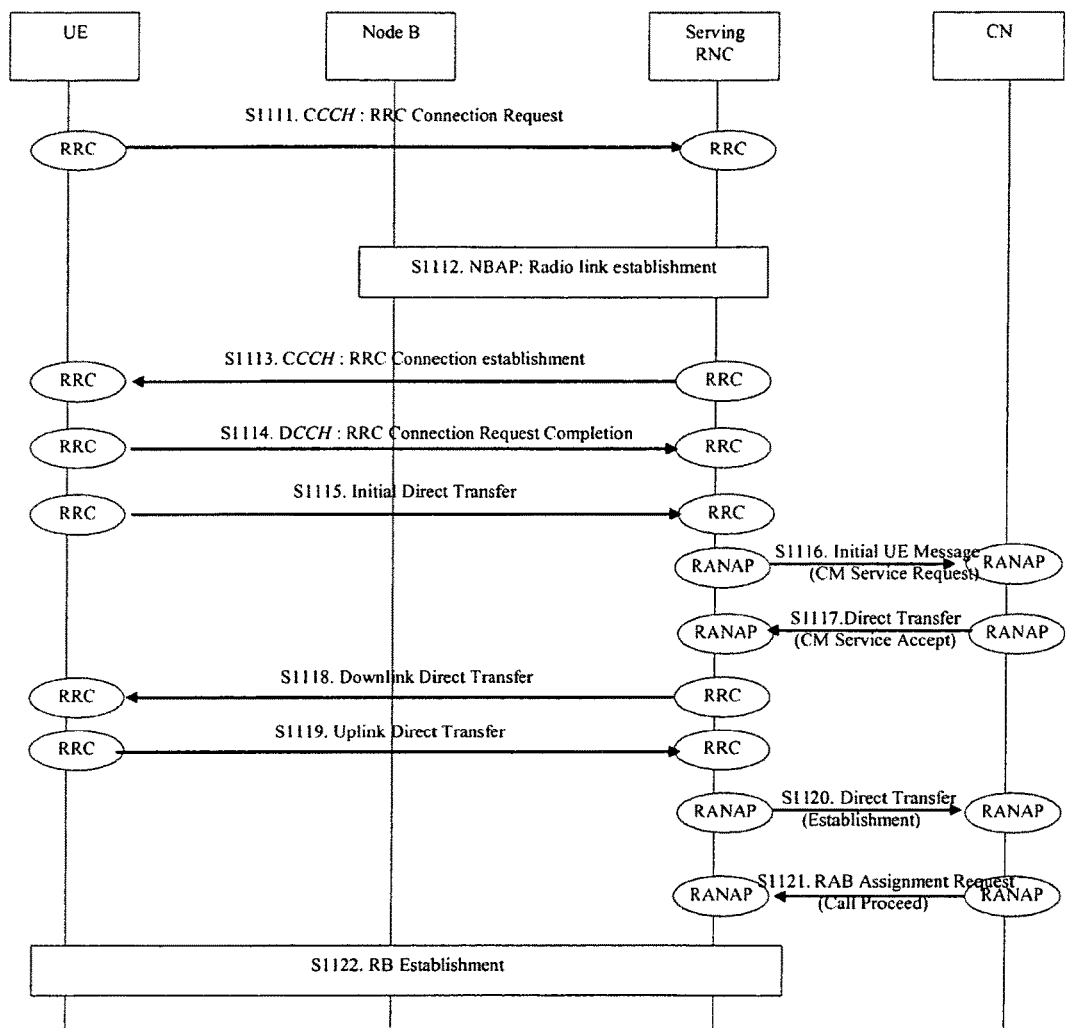
FIG. 2 shows a typical call establishment flow chart of a call originating from UE in an idle mode according to an embodiment.

FIG. 2 shows a typical call flow chart of establishing a call originating from a UE in an idle mode according to associated 3GPP standards. The call establishment flow involves a core network (for example, core network 110), a serving RNC (for example, RNC 124a), a node B (for example, node B 126a) and UE (for example, UE 130). The call may be for example a voice call, a data call, and the like. The call establishment may be carried out in a MBMS dedicated frequency or in a normal frequency.

The call establishment process as shown in FIG. 2 comprises the steps in the following sequence: the UE sends a RRC connection request message to the serving RNC (step S1111); a radio link is established between the serving RNC and the node B (step S1112); the serving RNC sends a RRC connection establishment message to the UE (step S1113); the UE sends a RRC connection request completion message to the serving RNC (step S1114); the UE sends an initial direct transfer message to the serving RNC(step S1115); the serving RNC sends an initial UE message (CM service request) to the core network (step S1116); the core network sends a direct transfer message(CM service accept) to the serving RNC (step S1117); the serving RNC sends a downlink direct transfer message to the UE (step S1118); the UE sends an uplink direct transfer message to the serving RNC (step S1119); the serving RNC sends a direct transfer message (establish) to the core network (step S1120); the core network sends a RAB assignment request message (call proceed) to the serving RNC (step S1121); and RB establishment is carried out between the serving RNC and the UE (step S1122). Since the above steps shown in FIG. 2 are known to the skilled in the art, further description thereof is omitted here for purpose of concision.

Solution 1:

Before calling a non-MBMS service, the UE initiates a cell re-selecting process.

Figure 3:
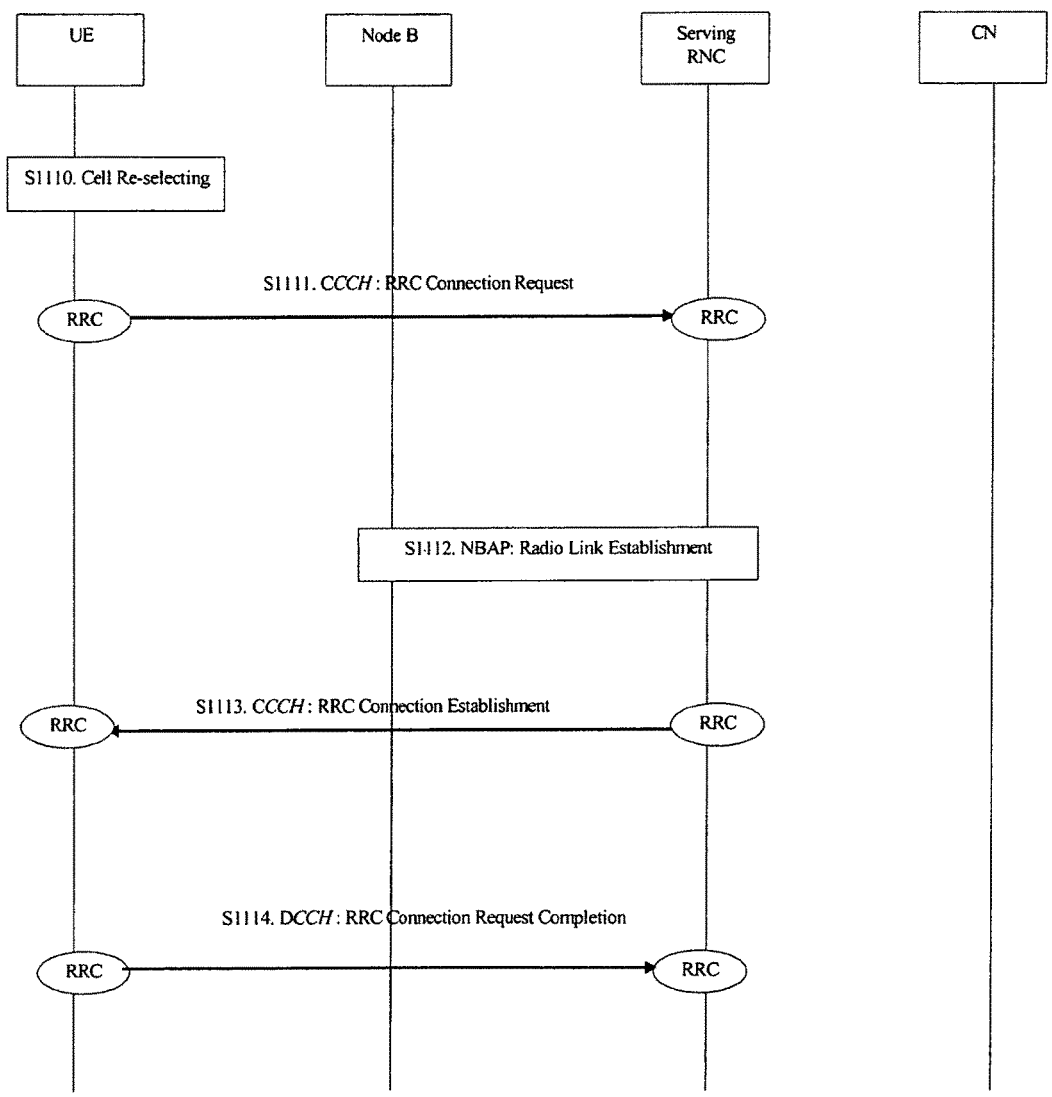
FIG. 3 shows a call establishment flow chart of a call originating from UE in an idle mode corresponding to an embodiment.

FIG. 3 shows a call establishment flow chart of a call originating from UE in an idle mode corresponding to solution 1. The skilled in the art can understand, FIG. 3 only shows partially the call establishment flow associated with the embodiment of the present invention, and remaining steps may refer to FIG. 2.

In this circumstance, the UE may implement a service priority differentiation process by the upper layers.

When, for example, a non-MBMS service has a higher priority level than a MBMS service, the UE initiates a cell re-selecting process to re-select to a preferred frequency for a non-MBMS service (step S1110).

Then, in the normal frequency, i.e. the frequency supporting the non-MBMS service, the UE initiates a non-MBMS service establishment process, for example, sending a RRC connection request message to the UTRAN (step S1111).

Under this situation, the behavior of the UE is dependent on the implementation of the UE.

However, it should be noted that if the UE receives the MBMS service via a Point-to-Point (P2P) radio bearer (RB) (the UE may be in the CELL-DCH state or CELL-FACH state), the UE may firstly use a MBMS MODIFICATION REQUEST message to request UTRAN to terminate the MBMS service (not shown). In other words, before the cell re-selecting process is initiated to re-select to a preferred frequency for a non-MBMS service, the UE requests the UTRAN to terminate the MBMS service.

Solution 2:

When the UE requests to establish a non-MBMS service, for example, when sending a RRC connection request message to the UTRAN, UTRAN initiates a re-directing process to re-direct the UE to the normal frequency.

Specifically, when the UE requests to establish a non-MBMS service in the MBMS dedicated frequency (step S1111), the UTRAN re-directs the UE from the MBMS dedicated frequency to the normal frequency supporting the non-MBMS service (step S1112 and step S1113). Or, when the UTRAN receives the RAB assignment request message from the core network (step S1121), the UTRAN re-directs the RB to the normal frequency at step S1122. In other words, different from solution 1, in solution 2, even if a call associated with the non-MBMS service originates from the UE, the UE still requests the UTRAN to establish the non-MBMS service in the MBMS dedicated frequency at first. The above scenario is also described in the following context.

Conclusion:

Under scenario 1, solution 1 is more preferable than solution 2, because solution 1 will not cause problem of signaling overload. However, when the MBMS dedicated frequency supports a non-MBMS service in a limited way, solution 2 may act as a supplementary solution.

Scenario 2:

A non-MBMS service terminates at UE in a MBMS dedicated frequency and in an idle mode.

For this scenario, there may be three solutions for establishing the non-MBMS service in the MBMS dedicated frequency.

Figure 4:
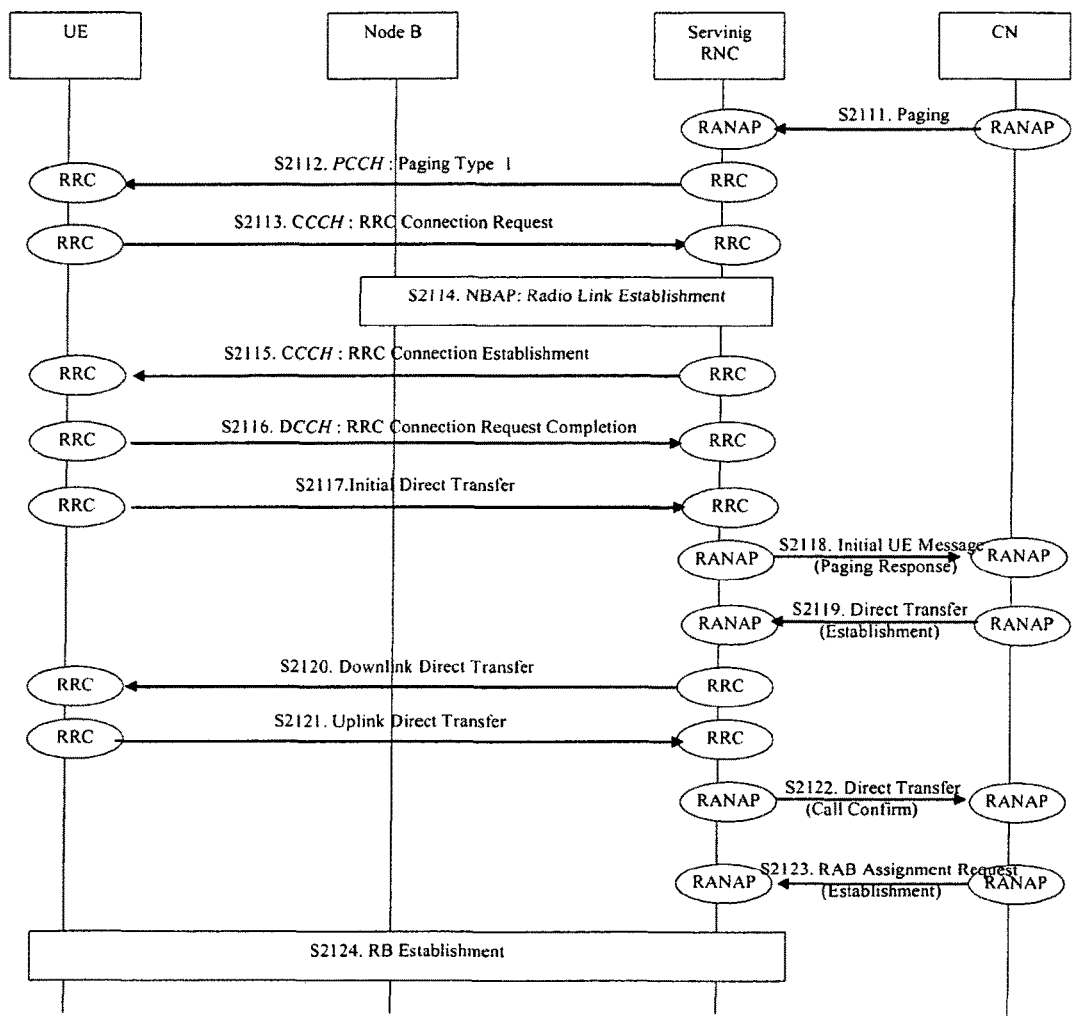
FIG. 4 shows a typical call establishment flow chart of a call terminating at UE in an idle mode according to an embodiment.

FIG. 4 shows a typical flow chart of establishing a call terminating at UE in an idle mode according to associated 3GPP standards. The call establishment flow involves a core network (for example, core network 110), a serving RNC (for example, RNC 124a), a node B (for example, node B 126a) and UE (for example, UE 130). The call may be for example a voice call, a data call, and the like. The call establishment may be carried out in a MBMS dedicated frequency or in a normal frequency.

The call establishment process as shown in FIG. 4 comprises the steps in the following sequence: the core network sends a paging message to the serving RNC (step S2111); the serving RNC sends a paging type 1 message to the UE (step S2112); the UE sends a RRC connection request message to the serving RNC (step S2113); a radio link is established between the serving RNC and the node B (step S2114); the serving RNC sends a RRC connection establishment message to the UE (step S2115); the UE sends a RRC connection request completion message to the serving RNC (step S2116); the UE sends an initial direct transfer message to the serving RNC (step S2117); the serving RNC sends an initial UE message (paging response) to the core network (step S2118); the core network sends a direct transfer message (establishment) to the serving RNC (step S2119); the serving RNC sends a downlink direct transfer message to the UE (step S2120); the UE sends an uplink direct transfer message to the serving RNC (step S2121); the serving RNC sends a direct transfer message (call confirmation) to the core network (step S2122); the core network sends the RAB assignment request message (establishment) to the serving RNC (step S2123); and a RB establishment process is carried out between the serving RNC and the UE (step S2124).

Since the above steps shown in FIG. 4 are known to the skilled in the art, further description thereof is omitted here for purpose of concision.

Solution 1:

When the UE receives a paging message, it initiates a cell re-selecting process to re-select to a preferred frequency for a non-MBMS service.

Figure 5:
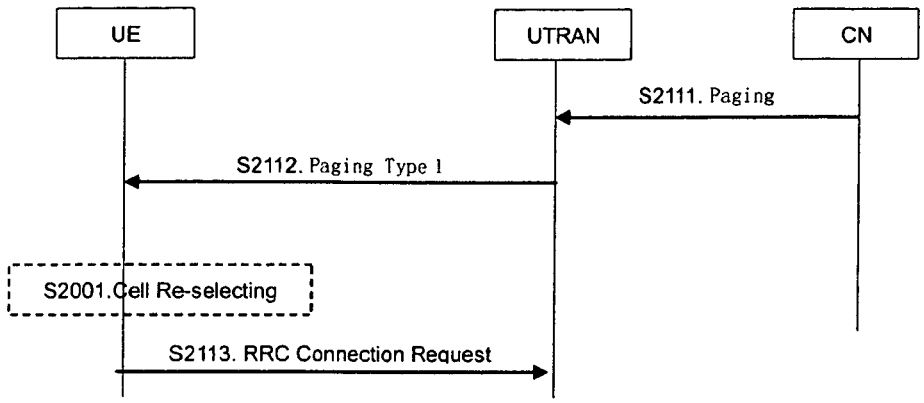
FIG. 5 shows a call establishment flow chart of a call terminating at UE in an idle mode corresponding to an embodiment.

FIG. 5 shows a call establishment flow chart of a call terminating at UE in an idle mode corresponding to solution 1. The skilled in the art can understand, FIG. 5 only shows partially the call establishment flow associated with the embodiment of the present invention, and remaining steps may refer to FIG. 4.

The UE receives in the MBMS dedicated frequency a paging type 1 message (in the CELL-FACH and CELL-DCH states, it is paging type 2 message, while in other situations, it is paging type 1 message) from the UTRAN (step S2112). After receiving a paging message directed to the UE from the core network (step S2111), the UTRAN sends the paging type 1 message to the UE.

From the paging type 1 message, the UE determines that a non-MBMS service (for example a voice call) terminates thereat. Thus, the UE may initiate a cell re-selecting process to re-select to a normal frequency for a non-MBMS service (step S2001). Next, the UE sends a RRC connection establishment message in the normal frequency (step S2113).

From the above discussion, it can be derived that, at step S2112, the UE works in the MBMS dedicated frequency, while at step S2113 and thereafter, the UE works in the normal frequency for a non-MBMS service, and what's more, a cell re-selecting process is initiated to re-select to the normal frequency for the non-MBMS service at step S2001.

The advantages of the solution are: since the cell re-selecting process is initiated by the UE, only the UE is influenced, rather than the UTRAN; and the solution will not cause signaling overload, which is most important, because in the MBMS dedicated frequency, there are thousands of UEs receiving a MBMS service; and further, the solution has a relatively short call delay.

However, a drawback of the solution is when the UE determines not to receive the non-MBMS service afterwards, MBMS data will lose. For example, when the UE refuses a voice call based the telephone number (the UE may know the telephone number after step S2120 of FIG. 4) and then returns to the MBMS dedicated frequency, MBMS data will lose.

Solution 2:

When the UTRAN receives response from the UE, the UTRAN re-directs the UE from the MBMS dedicated frequency to the normal frequency supporting a non-MBMS service.

Figure 6:
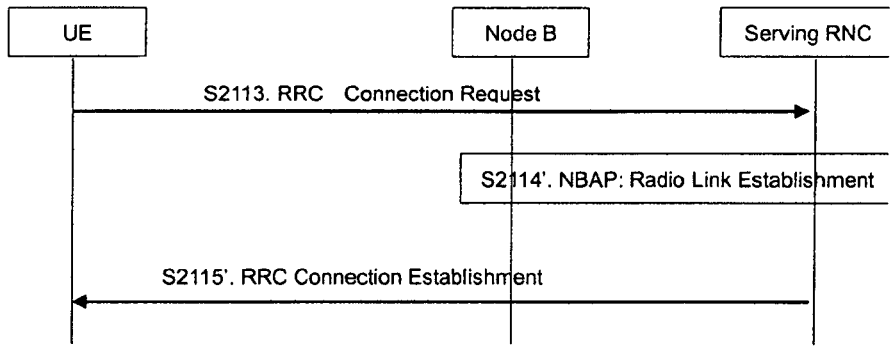
FIG. 6 shows a call establishment flow chart of a call terminating at UE in an idle mode according to another embodiment.

FIG. 6 shows a call establishment flow chart of a call terminating at UE in an idle mode corresponding to solution 2. The skilled in the art can understand, FIG. 6 only shows partially the call establishment flow associated with the embodiment of the present invention, and remaining steps may refer to FIG. 4.

After the UE receives a paging type 1 message from the UTRAN in a MBMS dedicated frequency, the UE sends a RRC connection request message to the serving RNC in the MBMS dedicated frequency (step S2113). After the serving RNC receives the RRC connection request message, the UE is re-directed from the MBMS dedicated frequency to the normal frequency supporting a non-MBMS service by means of the RRC connection establishment message (step S2115'), wherein the RRC connection establishment message is transmitted in the MBMS dedicated frequency, for notifying the UE to establish a radio link in the normal frequency. Of course, at step S2114', a radio link is established in the normal frequency between the corresponding node B and the serving RNC, wherein step S2114' is between step S2113 and step S2115'.

From the above description, it can be derived that at step S2115' and its preceding steps, the UE works in the MBMS dedicated frequency; while after step S2115', the UE works in the normal frequency supporting a non-MBMS service.

Compared with solution 1, the advantage of the solution is that the UE and the UTRAN are influenced simultaneously. However, compared with solution 1, the solution has drawbacks such as: likely causing signaling overload, increasing call delay, and the MBMS dedicated frequency being required to configure with a physical random access channel (PRACH) for signaling transfer.

Solution 3:

The UE terminates the non-MBMS service negotiation with the core network in the MBMS dedicated frequency and the UTRAN may re-direct a service radio bearer (RB) to a normal frequency.

Figure 7:
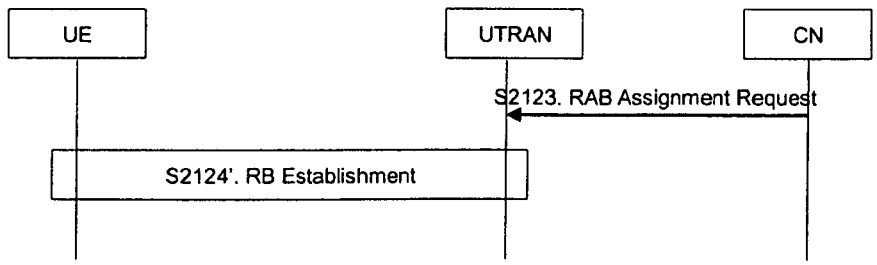
FIG. 7 shows a call establishment flow chart of a call terminating at UE in an idle mode corresponding to another embodiment.

FIG. 7 shows a call establishment flow chart of a call terminating at UE in an idle mode corresponding to solution 3. The skilled in the art can understand, FIG. 7 only shows partially the call establishment flow associated with the embodiment of the present invention, and remaining steps may refer to FIG. 4.

The UE terminates the non-MBMS service negotiation with the core network in the MBMS dedicated frequency (steps S2111-S2122). If the UE confirms the call, the core network may send a radio access bearer (RAB) assignment request message to the UTRAN (step S2123). Then, the UTRAN may re-direct the RB from the MBMS dedicated frequency to the normal frequency (step S2124'). At the step (step S2124'), RB is established in the normal frequency. However, if the UE refuses to terminate the call, the process ends, without proceeding with steps S2123 and S2124'.

From the above description, it can be derived that before step S2124', the UE has constantly been working in the MBMS dedicated frequency.

An advantage of the solution is that the UE is capable of determining whether to accept terminating the call, which can prevent loss of MBMS data.

However, the solution has drawbacks: since the UE continuously works in the MBMS dedicated frequency, it is likely to cause signaling overload; the MBMS dedicated frequency is required to configure with PRACH for signaling transfer; and call delay increases.

Conclusion:

Among the above three solutions, solution 1 is preferable, since it is much simpler and more stable.

Scenario 3:

A non-MBMS service terminates at UE in a MBMS dedicated frequency and in the CELL-DCH state.

Figure 8:
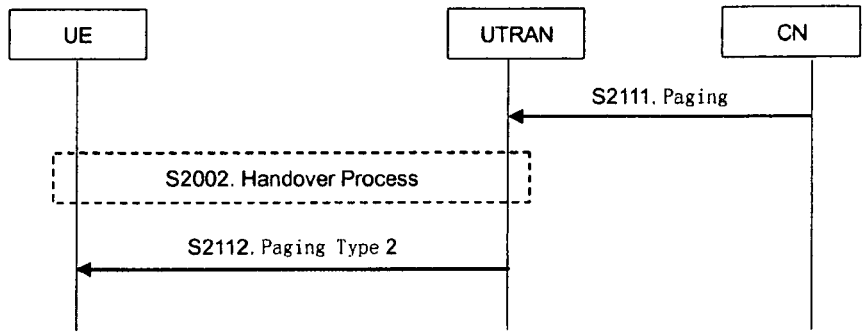
FIG. 8 shows a call establishment flow chart of a non-MBMS service terminating at UE in a MBMS dedicated frequency and in the CELL-DCH state according to an embodiment.

FIG. 8 shows a call establishment flow chart of a non-MBMS service terminating at UE in a MBMS dedicated frequency and in the CELL-DCH state. The skilled in the art can understand, FIG. 8 only shows partially the call establishment flow associated with the embodiment of the present invention, and remaining steps may refer to FIG. 4.

In this scenario, since UE in the CELL-DCH state can not carry out the cell re-selecting process, and thus after the UTRAN receives a paging message directed to the UE from the core network (step S2111), the UTRAN initiates a cell handover process to hand over the UE from the MBMS dedicated frequency to the normal frequency (step S2002). Then, the UTRAN sends a paging type 2 message to the UE in the normal frequency (step S2112).

From the above description, it can be derived that at step S2122 and thereafter, the UE has constantly been working in the normal frequency.

And from FIG. 8, it can be seen that the cell handover process (step S2002) involves interaction between the UE and the UTRAN.

As to the scenario 3, the solution described above is preferable. However, solution 2 or solution 3 described in scenario 2 may also be employed.

Scenario 4:

A non-MBMS service terminates at UE in a MBMS dedicated frequency and in the CELL-FACH, CELL-PCH or URA-PCH state.

Figure 9:
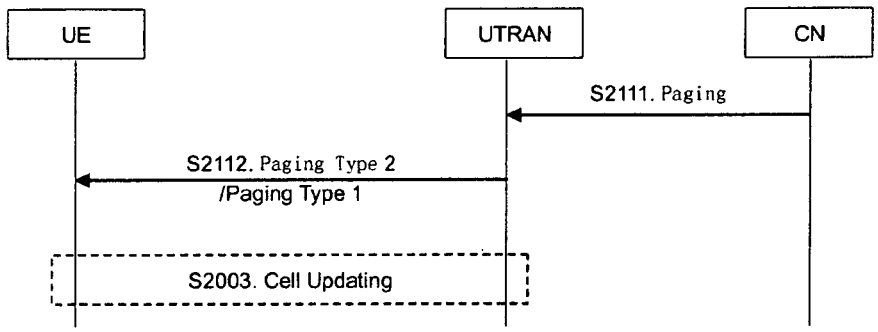
FIG. 9 shows a call establishment flow chart of a non-MBMS service terminating at UE in a MBMS dedicated frequency and in the CELL-FACH, CELL-PCH or URA-PCH state according to an embodiment.

FIG. 9 shows a call establishment flow chart of a non-MBMS service terminating at UE in a MBMS dedicated frequency and in the CELL-FACH, CELL-PCH or URA-PCH state. The skilled in the art can understand, FIG. 9 only shows partially the call establishment flow associated with the embodiment of the present invention, and remaining steps may refer to FIG. 4.

In this scenario, after the UE receives in the MBMS dedicated frequency a paging type 1 or paging type 2 message directed thereto (step S2112), it initiates a cell updating process (step S2003) so as to re-select from the MBMS dedicated frequency to the normal frequency. Next, the UE sends a RRC connection establishment message in the normal frequency (step S2113).

From the above description, it can be derived that at step S2113 and thereafter, the UE has constantly been working in the normal frequency.

And from FIG. 9, it can be seen that the cell updating process (step S2003) involves interaction between the UE and the UTRAN.

As to the scenario 4, the solution described above is preferable. However, solution 1, solution 2 or solution 3 described in scenario 2 may also be employed.

Hereinafter, the preferred embodiments of the present invention are summarized:

1) If a non-MBMS service originates from the UE, the CE voluntarily initiates a cell re-selecting process so as to re-select from a MBMS dedicated frequency to a normal frequency;

2) If the UE is in the CELL-FACH, CELL-PCH or URA-PCH state, after the UE receives a paging message directed thereto in the MBMS dedicated frequency, it re-selects to the normal frequency through the cell re-selecting process, wherein the cell re-selecting process includes a cell updating process which involves the UE and the UTRAN;

3) If the UE is the CELL-DCH state, after the UTRAN receives a paging message directed to the UE from the core network, it will initiate a re-directing process so as to re-direct the UE from the MBMS dedicated frequency to the normal frequency, wherein the re-directing process comprises a cell handover process which involves the UE and the UTRAN;

4) Besides the above three scenarios, if the UE requests to establish a non-MBMS service (the non-MBMS service may originate from or terminate at the UE), the UTRAN will initiate a re-directing process so as to re-direct the UE from the MBMS dedicated frequency to the normal frequency.

Figure 10:
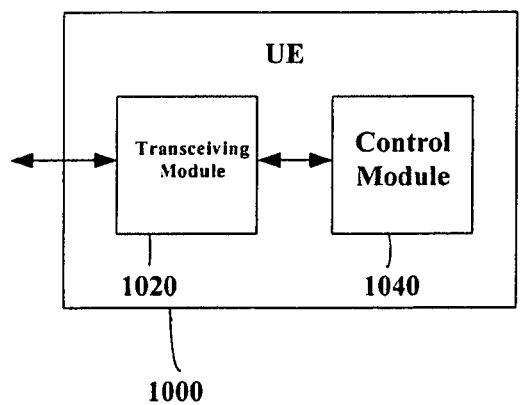
FIG. 10 shows a block diagram of user equipment according to an embodiment.

FIG. 10 shows a block diagram of user equipment UE capable of implementing the above methods according to an embodiment. As shown in FIG. 10, UE 1000 comprises a transceiving module 1020 and a control module 1040.

The transceiving module 1020 may work in a MBMS dedicated frequency or in a normal frequency.

Specifically, if the control module 1040 determines that the non-MBMS service originates from the UE 1000, the control module 1040 may initiate a re-selecting process to re-select to a frequency suitable for a non-MBMS service so as to re-select from the MBMS dedicated frequency to the normal frequency, so as to establish and carry out the non-MBMS service in the normal frequency.

If the control module 1040 knows that the UE 1000 is in the CELL-FACH, CELL-PCH, or URA-PCH state, after the transceiving module 1020 receives a paging message in the MBMS dedicated frequency, the control module 1040 initiates a cell re-selecting process to re-select to a normal frequency, wherein the cell re-selecting process includes the cell updating process. Thereafter, the transceiving module 1020 works in the normal frequency.

The transceiving module 1020 and the control module 1040 may be software, hardware, firmware and/or combination of software, hardware and/or firmware.

Figure 11:
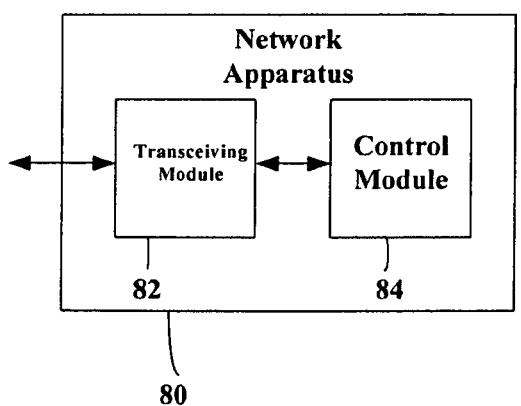
FIG. 11 shows a block diagram of a network apparatus according to an embodiment.

FIG. 11 shows a block diagram of a network apparatus capable of implementing the above methods according to an embodiment. As shown in FIG. 11, the network apparatus 1100 comprises a transceiving module 1120 and a control module 1140.

Specifically, if the transceiving module 1120 receives the request of UE to establish a non-MBMS service (the non-MBMS service may originate from or terminate at the UE) in the MBMS dedicated frequency, the control module 1140 determines that it is necessary to carry out the non-MBMS service, and will initiate a re-directing process to re-direct the UE from the MBMS dedicated frequency to the normal frequency, so as to establish and carry out the non-MBMS service in the normal frequency.

If the control module 1140 knows that the UE is in the CELL-DCH state, after the transceiving module 1120 receives from the core network the paging message directed to the UE, the control module 1140 will initiate a re-directing process to re-direct the UE from the MBMS dedicated frequency to the normal frequency, wherein the re-directing process includes the cell handover process.

The network apparatus 1100 may be included in the RNC.

The transceiving module 1120 and the control module 1140 may be software, hardware, firmware and/or combination of software, hardware and/or firmware.

The present invention is described above with a MBMS service dedicated frequency which does not support non-MBMS service as an example. However, the skilled in the art can understand that the present invention is not limited thereto. As long as a service which a dedicated frequency does not support is to be established on the dedicated frequency so as to carry out the service in another frequency, the present application is applicable. It should be understood that the above scenario may also possibly exist in a cable network.

All in all, many other alterations and modifications may be made without departing from the concept and scope of the present invention. It should be understood that the present invention is not limited to specific embodiments, and its scope is defined by the appending claims.

What is claimed is:

1. A method for establishing a non-MBMS service in a first frequency in a communication network, said method comprising:
   determining said non-MBMS service to be established; and
   re-selecting to a second frequency that is preferred for said non-MBMS service or re-directing to a second frequency that is preferred for said non-MBMS service, so as to carry out said non-MBMS service in said second frequency;
   wherein said first frequency supports a MBMS service and does not support said non-MBMS service or supports said non-MBMS service in a limited way;
   wherein said communication network comprises a radio cellular communication network, said radio cellular communication network follows associated 3GPP standards; and
   wherein said communication network comprises user equipment and said user equipment is in an idle mode, said user equipment implements a service priority differentiation process to determine that said non-MBMS service has a higher priority than said MBMS service, and initiates a cell re-selecting process so as to re-select to said second frequency from said first frequency.

2. The method according to claim 1, wherein said communication network comprises user equipment and if said non-MBMS service originates from said user equipment, said user equipment initiates a re-selecting process to re-select to the second frequency that is suitable for said non-MBMS service.

3. The method according to claim 1, wherein said communication network comprises a network apparatus and if said network apparatus receives a message of request for establishing said non-MBMS service sent by user equipment in said first frequency, said network apparatus initiates a re-directing process so as to re-direct said user equipment from said first frequency to said second frequency.

4. The method according to claim 1, wherein said communication network comprises user equipment and if said user equipment is in CELL- FACH, CELL-PCH or URA-PCH state, said user equipment initiates a cell updating process so as to re-select to said second frequency from said first frequency.

5. The method according to claim 1, wherein said communication network comprises a network apparatus and if said network apparatus knows user equipment is in the CELL-DCH state, said network apparatus initiates a cell handover process so as to re-direct said user equipment to said second frequency from said first frequency.

6. User equipment for establishing a non-MBMS service in a first frequency in a communication network, said user equipment comprises:
   a processor programmed to:
   determine said non-MBMS service to be established, and re-select to a second frequency that is preferred for said non-MBMS service so as to carry out said non-MBMS service in said second frequency;
   wherein said first frequency supports a MBMS service and does not support said non-MBMS service or supports said non-MBMS service in a limited way;

wherein said communication network comprises a radio cellular communication network, said radio cellular communication network follows associated 3GPP standards; and wherein said user equipment is in an idle mode, said processor implements a service priority differentiation process to determine that said non-MBMS service has a higher priority than said MBMS service, and initiates a cell re-selecting process so as to re-select to said second frequency from said first frequency.

7. The user equipment according to claim 6, wherein if said non-MBMS service originates from said user equipment, the processor initiates a re-selecting process to re-select to the second frequency that is suitable for said non-MBMS service.

8. The user equipment according claim 6, wherein if said user equipment is in the CELL-FACH, CELL-PCH or URA-PCH state, said processor initiates a cell updating process so as to re-select to said second frequency from said first frequency.

9. A network apparatus for establishing a non-MBMS service in a first frequency in a communication network, wherein said network apparatus comprises:
 a processor programmed to:
 determine said non-MBMS service to be established by user equipment, and re-direct said user equipment from said first frequency to a second frequency that is preferred for said non-MBMS service so as to carry out said non- MBMS service in said second frequency;

wherein said first frequency supports a MBMS service and does not support said non-MBMS service or supports said non-MBMS service in a limited way;

wherein said communication network comprises a radio cellular communication network, said radio cellular communication network follows associated 3GPP standards; and wherein said user equipment is in an idle mode, said user equipment implements a service priority differentiation process to determine that said non-MBMS service has a higher priority than said MBMS service, and initiates a cell re-selecting process so as to re- select to said second frequency from said first frequency.

10. The network apparatus according to claim 9, wherein if said network apparatus receives a message of request for establishing said non-MBMS service send by said user equipment in said first frequency, said processor initiates a re-directing process so as to re-direct said user equipment from said first frequency to the second frequency that is suitable for said non-MBMS service, thereby carrying out said non-MBMS service in said second frequency.

11. The network apparatus according to claim 9, wherein if said network apparatus knows said user equipment is in the CELL-DCH state, said processor initiates a cell handover process so as to re-direct said user equipment from said first frequency to said second frequency.

12. The network apparatus according to claim 9, wherein said network apparatus is included in a radio resource controller.

* * * * *